US012808475B2

(12) United States Patent
Lee et al.

(10) Patent No.: US 12,808,475 B2
(45) Date of Patent: Nov. 24, 2026

(54) FLUID MOUNT DEVICE FOR AN ELECTRIC VEHICLE

(71) Applicants: HYUNDAI MOTOR COMPANY, Seoul (KR); KIA CORPORATION, Seoul (KR)

(72) Inventors: Ju Sang Lee, Hwaseong-si (KR); Seung Ho Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 112 days.

(21) Appl. No.: 19/085,404

(22) Filed: Mar. 20, 2025

(65) Prior Publication Data

US 2026/0146698 A1 May 28, 2026

(30) Foreign Application Priority Data

Nov. 25, 2024 (KR) ........................ 10-2024-0169207

(51) Int. Cl.
*F16F 5/00* (2006.01)
*B60R 16/08* (2006.01)
*F16L 55/04* (2006.01)

(52) U.S. Cl.
CPC ............ *F16L 55/041* (2013.01); *B60R 16/08* (2013.01)

(58) Field of Classification Search
CPC ...... F16L 55/041; F16L 55/035; B60R 16/08; F16F 13/1463; B60K 5/1216
See application file for complete search history.

(56) References Cited

U.S. PATENT DOCUMENTS

| | | | | |
|---|---|---|---|---|
| 4,681,306 A * | 7/1987 | Hofmann | F16F 13/262 | 267/140.13 |
| 6,454,249 B1 * | 9/2002 | Childers | F16F 13/262 | 267/140.14 |
| 2011/0109027 A1 * | 5/2011 | Ito | F16F 1/3842 | 29/446 |
| 2021/0396295 A1 * | 12/2021 | Rawlings | F16F 13/1409 | |

FOREIGN PATENT DOCUMENTS

KR 20220017646 A 2/2022

* cited by examiner

*Primary Examiner* — Amy J. Sterling
(74) *Attorney, Agent, or Firm* — Lempia Summerfield Katz LLC

(57) ABSTRACT

A fluid mount device includes a main bushing mounted on an outer peripheral surface of an inner pipe and having a plurality of liquid chambers separated from each other. The fluid mount device further includes an outer pipe mounted on an outer peripheral surface of the main bushing and configured to seal the plurality of liquid chambers and includes a nozzle unit having a damping flow path configured to allow a fluid accommodated in a liquid chamber of the plurality of liquid chambers to flow in accordance with a change in volume of the liquid chamber. The fluid mount device also includes a coupling plate mounted at a rear side of the main bushing and configured to seal a rear liquid chamber that communicates with the liquid chamber through the damping flow path.

15 Claims, 12 Drawing Sheets

FLUID MOUNT DEVICE FOR AN ELECTRIC VEHICLE

CROSS-REFERENCE TO RELATED APPLICATION

This application claims under 35 U.S.C. § 119(a) the benefit of and priority to Korean Patent Application No. 10-2024-0169207 filed on Nov. 25, 2024, the entire contents of which are incorporated herein by reference.

BACKGROUND

(a) Technical Field

The present disclosure relates to a fluid mount device for an electric vehicle. More particularly, the present disclosure relates to a fluid mount device for an electric vehicle capable of reducing low-frequency dynamic characteristics by allowing a fluid to flow along a damping flow path formed in a liquid chamber when a load is applied.

(b) Background Art

In general, vehicles, which are equipped with gasoline and diesel engines that use fossil fuel, have many problems such as environmental pollution due to exhaust gases, global warming due to carbon dioxide, and respiratory diseases due to ozone production.

In addition, fossil fuel existing on Earth is finite and will eventually be depleted.

In order to solve the above-mentioned problems, electric vehicles have been developed, such as pure electric vehicles (EVs) configured to travel by operating drive motors, hybrid electric vehicles (HEVs) configured to travel by using engines and drive motors, and fuel cell electric vehicles (FCEVs) configured to travel by operating drive motors by using electric power generated by fuel cells.

Typically, the engine of a vehicle always structurally generates vibration. Vibration is generated in all directions because various factors, including unevenness of ground surfaces, are complexly combined while the vehicle travels.

In particular, in the case of a vehicle equipped with the gasoline engine, a piston operates through a four-stroke cycle, including intake, compression, ignition, and exhaust, to generate rotational torque for a crank shaft. Significant vibration is generated during this process.

To insulate the vibration, an engine mount configured to support the engine of the vehicle is being continuously developed. In particular, various studies are being conducted with the main objective of ensuring insulation properties against a main vibratory force or the like generated by the gasoline engine.

The above information disclosed in this Background section is only for enhancement of understanding of the background of the disclosure. Therefore, the Background section may contain information that does not form the prior art that is already known to a person of ordinary skill in the art.

SUMMARY

Unlike a vehicle using a gasoline engine, an electric vehicle using a drive motor does not have a piston reciprocating motion such as ignition. Because of this lack of piston reciprocating motion, the role of a motor mount of an electric vehicle must be changed to be different from the role of the engine mount of the vehicle using the gasoline engine so that the motor mount insulates shock vibration, jerk vibration, traveling vibration, gear fine noise, and the like.

The present disclosure has been made in an effort to solve the above-described problems associated with the prior art. The present disclosure provides a fluid mount device for an electric vehicle, in which a lower liquid chamber and a rear liquid chamber, which is connected to the lower liquid chamber, are separated. The present disclosure further provides a membrane that is added to the lower liquid chamber, such that a fluid flows along a damping flow path from the lower liquid chamber to the rear liquid chamber or from the rear liquid chamber to the lower liquid chamber when a volume is changed by a load, thereby maintaining low dynamic characteristics.

The present disclosure provides a fluid mount device for an electric vehicle. The fluid mount device includes a main bushing mounted on an outer peripheral surface of an inner pipe and having a plurality of liquid chambers formed to be separated. The fluid mount device further includes an outer pipe mounted on an outer peripheral surface of the main bushing and configured to seal the plurality of liquid chambers and includes a nozzle unit having a damping flow path so that a fluid accommodated in a liquid chamber of the plurality of chambers flows in accordance with a change in volume of the liquid chamber. The fluid mount device also includes a coupling plate mounted at a rear side of the main bushing and configured to seal a rear liquid chamber that communicates with the liquid chamber through the damping flow path.

In an embodiment, in the main bushing, the plurality of liquid chambers may include an upper liquid chamber and a lower liquid chamber formed to be separated in an upward/downward direction based on the inner pipe.

Further, the nozzle unit may be seated on the lower liquid chamber and allow the lower liquid chamber and the rear liquid chamber to communicate with each other.

The nozzle unit may include a first nozzle part having a first flow hole, the first flow hole being configured to allow the fluid to be discharged from the lower liquid chamber, or to be introduced into the lower liquid chamber. The nozzle unit may further include a second nozzle part disposed to face the first nozzle part, the second nozzle part including the damping flow path, where the damping flow path includes a first damping flow path and a second damping flow path that both communicate with the rear liquid chamber. The nozzle unit may also include a membrane part seated on the second nozzle part and configured to selectively block the first flow hole while defining a connection flow path that communicates with the first damping flow path.

The connection flow path may be formed along a rim of the membrane part positioned between the first nozzle part and the second nozzle part.

Further, the membrane part may have a plurality of protrusion members provided in the upward/downward direction so that the membrane part is positioned to be spaced apart from the first nozzle part and the second nozzle part.

In addition, the membrane part may be made of a material having elasticity.

In addition, the first damping flow path may have a support member formed upright to support the membrane part.

In addition, the first nozzle part may have a second flow hole formed to be spaced apart from the first flow hole.

In an embodiment, the second damping flow path may communicate with the second flow hole and extend toward a rear side of the connection flow path (i.e., along a rear side of the second nozzle part) along a front rim of the connection flow path (i.e., along a front rim of the second nozzle part).

Further, the second damping flow path may be formed to allow the fluid to flow through the second flow hole when the first damping flow path is blocked by the membrane part.

In addition, the second nozzle part may have an outer peripheral surface formed to have a curvature so that the second nozzle part adjoins an inner peripheral surface of the outer pipe.

The coupling plate may include a ring plate having the same size as the main bushing and mounted to adjoin the main bushing. The coupling plate may further include a diaphragm coupled to surround the ring plate and configured to block an opened rear region of the main bushing and define the rear liquid chamber.

In an embodiment, the ring plate may have a curled portion bent so that the ring plate is seated on the main bushing.

Further, the diaphragm may be made of a material having elasticity so that the diaphragm is expanded as the fluid flows to the rear liquid chamber through the damping flow path.

According to the present disclosure, the lower liquid chamber and the rear liquid chamber, which is connected to the lower liquid chamber, are separated, and the membrane is added to the lower liquid chamber, such that the fluid flows along the damping flow path from the lower liquid chamber to the rear liquid chamber or from the rear liquid chamber to the lower liquid chamber when a volume is changed by a load, thereby maintaining low dynamic characteristics.

In addition, according to the present disclosure, the structure of the diaphragm is applied to the rear liquid chamber to absorb resistance made by the expansion of the volume of the rear liquid chamber when the fluid flows from the lower liquid chamber to the rear liquid chamber, which may solve the problem in which dynamic characteristics are increased by volume expansion resistance.

The above and other features of the disclosure are discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein.

Figure 1:
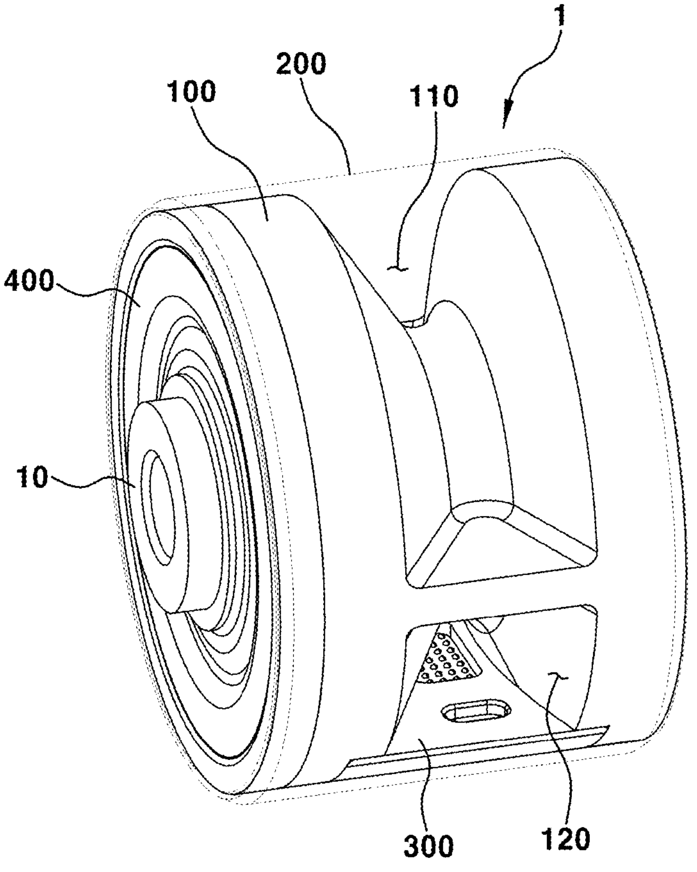
FIG. 1 is a view illustrating a coupled state of a fluid mount device for an electric vehicle according to an embodiment of the present disclosure.

It should be understood that the appended drawings are not necessarily drawn to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference is made in detail to various embodiments of the present disclosure, examples of which are illustrated in the accompanying drawings and described below. While the technical concepts of the present disclosure are described in conjunction with various embodiments, it should be understood that present description is not intended to limit the disclosure to the embodiments. On the contrary, the disclosure is intended to cover not only the disclosed embodiments, but also various alternatives, modifications, equivalents, and other embodiments, within the spirit and scope of the disclosure as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

When a component, device, element, controller, module, or the like (i.e., an apparatus) of the present disclosure is described as having a purpose or performing an operation, function, or the like, the component, device, element, controller, module, or the like should be considered herein as being "configured to" meet that purpose or to perform that operation or function. Each component, device, element, controller, module, or the like may separately embody or be included with a processor and a memory, such as a non-transitory computer readable media, as part of such an apparatus.

Spatially relative terms, such as "beneath," "below," "lower," "under," "above," "upper," and the like, may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. For example, if the device in the figures is rotated 90 degrees, elements described as "upper" or "lower" may then be to the right or the left of other elements. In addition, when an element is referred to as being "between" two elements, the element may be the only element between the two elements, or one or more other intervening elements may be present.

Hereinafter, an embodiment according to the present disclosure is described in detail with reference to the accompanying drawings.

Advantages and features of the present disclosure and methods of achieving the advantages and features should be clear with reference to various embodiments described in detail below together with the accompanying drawings.

However, the present disclosure is not limited to the embodiments disclosed herein but can be implemented in various forms. The embodiments of the present disclosure are provided so that the present disclosure is completely disclosed, and a person with ordinary skill in the art can fully understand the scope of the present disclosure. The present disclosure is defined only by the scope of the appended claims.

In addition, in the description of the present disclosure, the descriptions of publicly known related technologies are omitted when it is determined that the specific descriptions may obscure the subject matter of the present disclosure.

Figure 2:
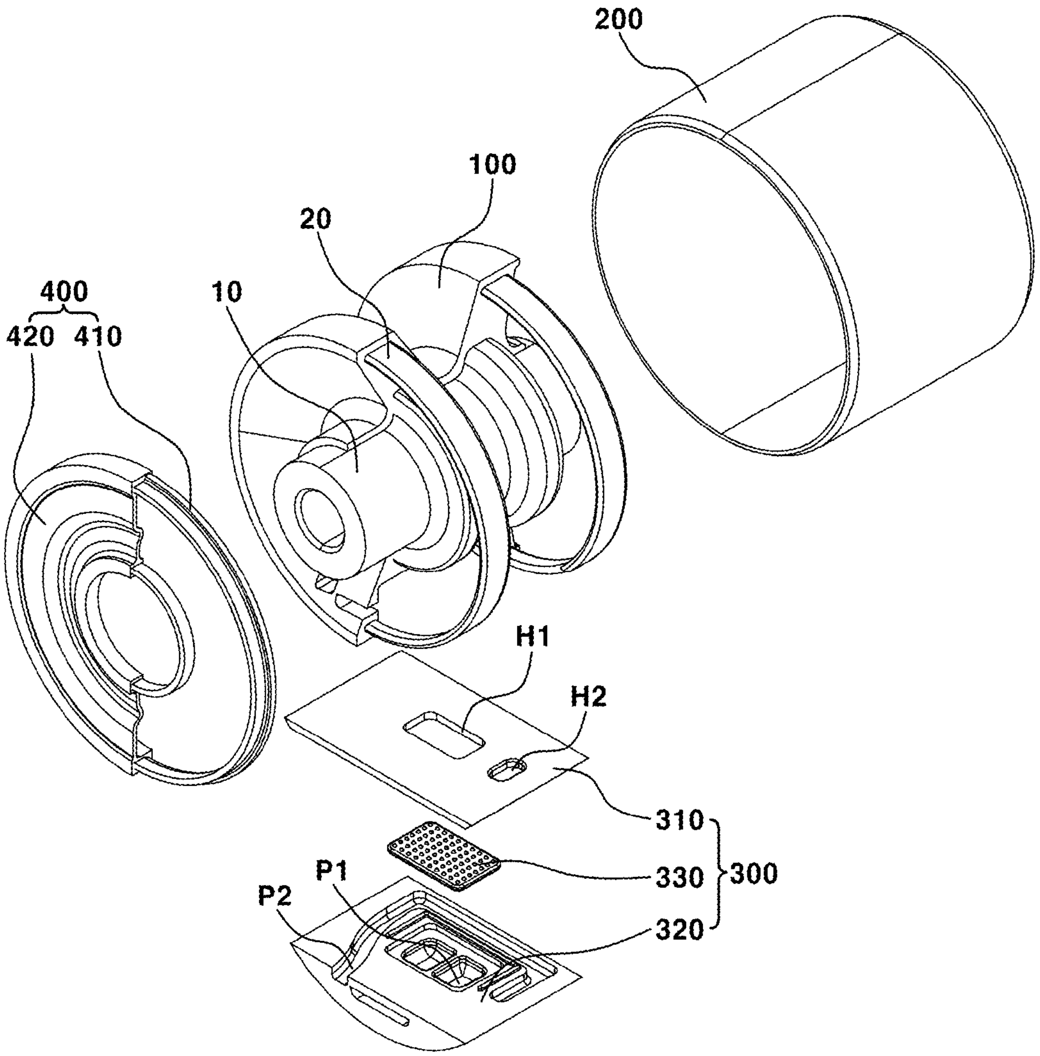
FIG. 2 is a view illustrating a separated state of a fluid mount device for an electric vehicle according to an embodiment of the present disclosure.
Figure 3:
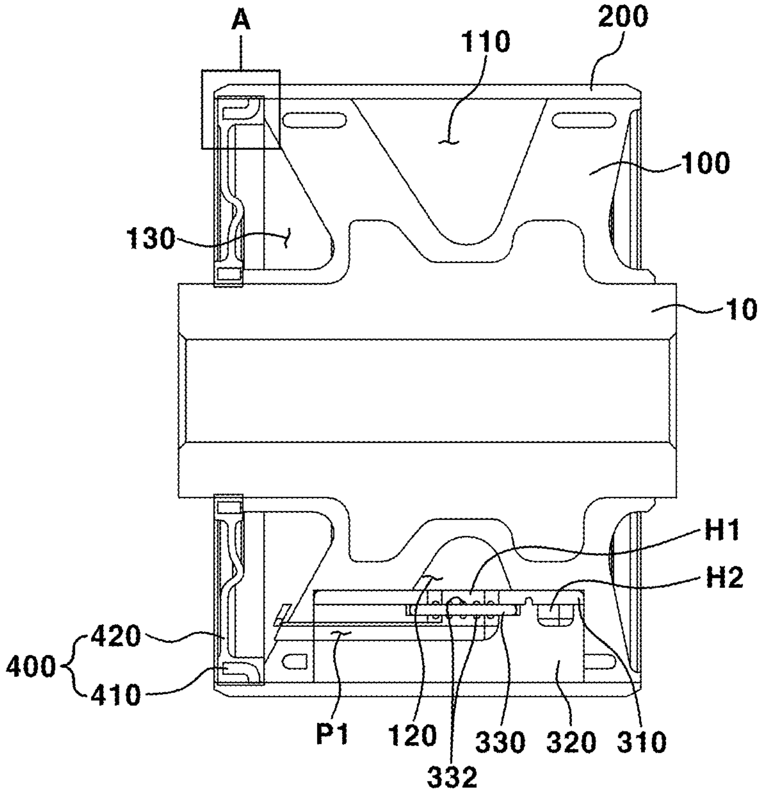
FIG. 3 is a view illustrating a structure of a fluid mount device for an electric vehicle according to an embodiment of the present disclosure.

FIG. 1 is a view illustrating a coupled state of a fluid mount device for an electric vehicle according to an embodiment of the present disclosure. FIG. 2 is a view illustrating a separated state of a fluid mount device for an electric vehicle according to an embodiment of the present disclosure. FIG. 3 is a view illustrating a structure of a fluid mount device for an electric vehicle according to an embodiment of the present disclosure.

Figure 4A:
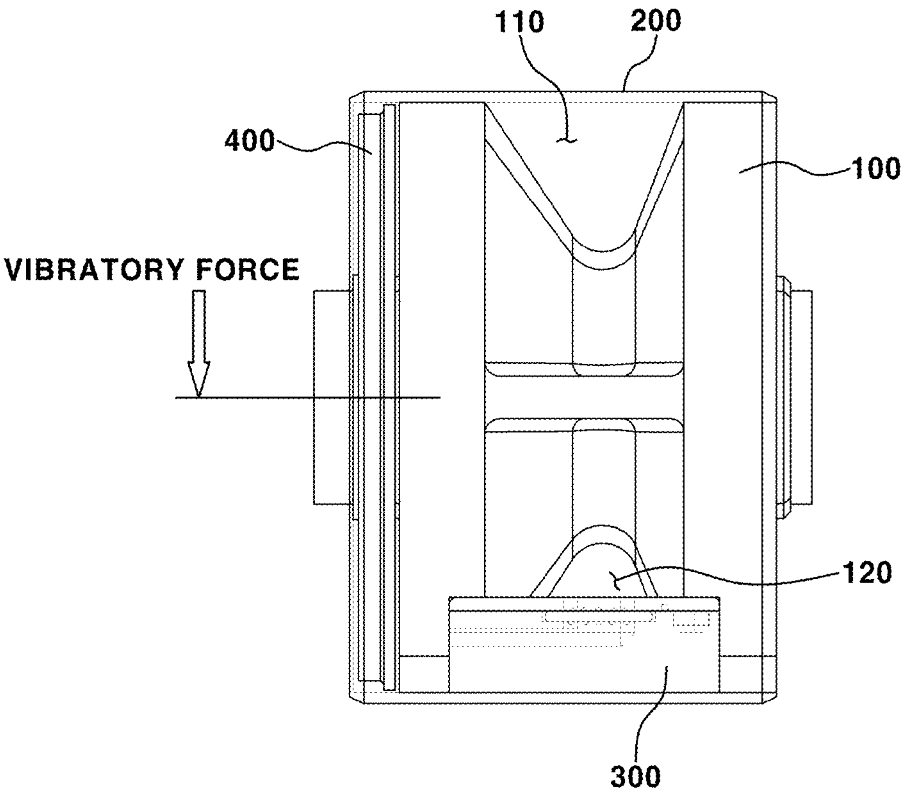
FIGS. 4A-4D are views illustrating a first embodiment for explaining a flow of a fluid in a fluid mount device for an electric vehicle according to an embodiment of the present disclosure.

Further, FIGS. 4A-4D are views illustrating a first embodiment for explaining a flow of a fluid in a fluid mount device for an electric vehicle according to an embodiment of the present disclosure. FIGS. 5A-5D are views illustrating a second embodiment for explaining a flow of the fluid in a fluid mount device for an electric vehicle according to an embodiment of the present disclosure. FIG. 6 is a view illustrating a curled portion of a fluid mount device for an electric vehicle according to an embodiment of the present disclosure.

As illustrated in FIGS. 1 and 2, a fluid mount device 1 for an electric vehicle according to an embodiment includes a main bushing 100, an outer pipe 200, a nozzle unit 300, and a coupling plate 400.

The main bushing 100 is mounted on an outer peripheral surface of an inner pipe 10 and includes a plurality of liquid chambers, i.e., an upper liquid chamber 110 and a lower liquid chamber 120 separated from each other.

More specifically, as illustrated in FIG. 3, in the main bushing 100, the upper liquid chamber 110 and the lower liquid chamber 120 are separated in an upward/downward direction based on the inner pipe 10. In other words, the upper liquid chamber 110 and lower liquid chamber 120 are separated in a direction perpendicular to a longitudinal axis of the inner pipe 10.

The outer pipe 200 is mounted on an outer peripheral surface of the main bushing 100 and surrounds the main bushing 100, such that the fluid accommodated in the upper liquid chamber 110 and the lower liquid chamber 120 is sealed.

Further, the nozzle unit 300 has a plurality of damping flow paths P1 and P2 so that the fluid accommodated in the lower liquid chamber 120 selectively flows to a rear liquid chamber 130 in accordance with a change in volume of the lower liquid chamber 120 (see FIGS. 2 and 3).

The nozzle unit 300 may be positioned in the lower liquid chamber 120 to enabling the nozzle unit 300 to support the main bushing 100, thereby reducing the amount of fluid to the main bushing 100.

The nozzle unit 300 is configured such that the lower liquid chamber 120 and the rear liquid chamber 130 communicate with each other through the plurality of damping flow paths P1 and P2. To this end, the nozzle unit 300 includes a first nozzle part 310, a second nozzle part 320, and a membrane part 330.

For example, the first nozzle part 310 has a first flow hole H1 so that the fluid is discharged from the lower liquid chamber 120 and flows to the rear liquid chamber 130 through the damping flow path P1. Likewise, the fluid, which has flowed through the damping flow path P1 from the rear liquid chamber 130, is introduced into the lower liquid chamber 120.

The second nozzle part 320 is disposed to face the first nozzle part 310 and includes the first damping flow path P1 and the second damping flow path P2 configured to communicate with the rear liquid chamber 130.

Particularly, the second nozzle part 320 may have a hemispherical cross-section. More particularly, an outer peripheral surface of the second nozzle part 320 may have a curvature so that the second nozzle part 320 adjoins an inner peripheral surface of the outer pipe 200.

The membrane part 330 defines connection flow paths P3 configured to communicate with the first damping flow path P1. The membrane part 330 is seated (disposed) on the second nozzle part 320 (see FIGS. 4B and 5B) and configured to block (or substantially block) the first flow hole H1. In this way, the membrane part 330 is configured to selectively block the first flow hole H1, based on a force being applied as described below.

In other words, the membrane part 330 is formed to have an area relatively smaller than an area of a seating region when the membrane part 330 is seated on the second nozzle part 320, such that the connection flow paths P3 may be formed.

In other words, the connection flow paths P3 are formed when the membrane part 330 is seated on the second nozzle part 320 and has a predetermined area, as described above. Therefore, when the first nozzle part 310 and the second nozzle part 320 are coupled together, the connection flow paths P3 are formed at a rim of the seating region in which the membrane part 330 is seated, and the connection flow paths P3 communicate with the first damping flow path P1 and the lower liquid chamber 120.

Figure 4B:
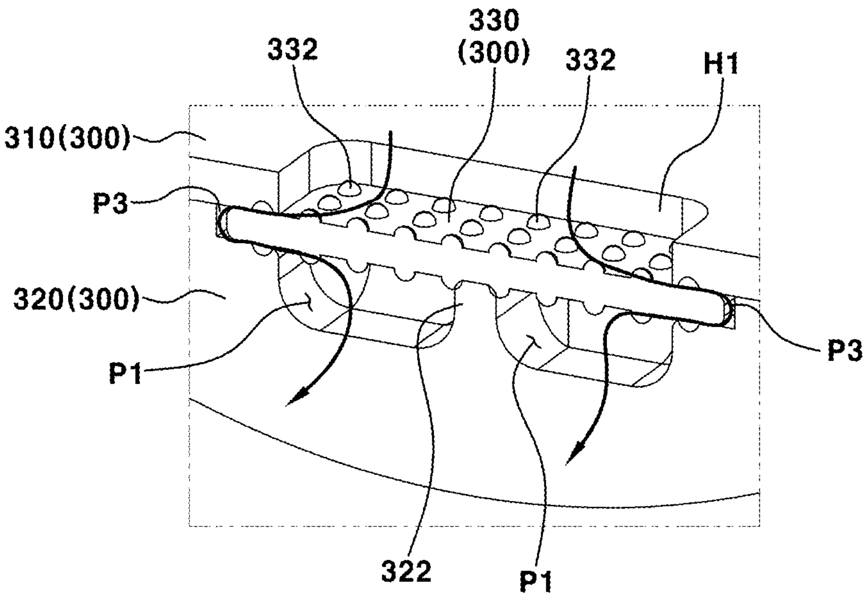
Figure 5A:
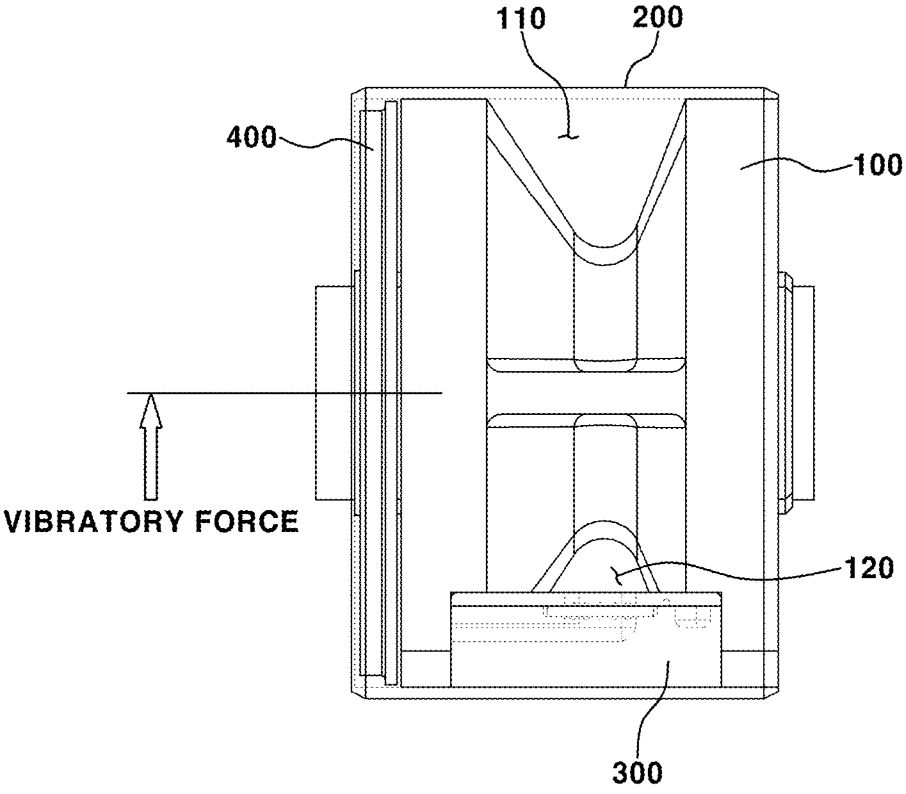
FIGS. 5A-5D are views illustrating a second embodiment for explaining a flow of the fluid in a fluid mount device for an electric vehicle according to an embodiment of the present disclosure.
Figure 5B:
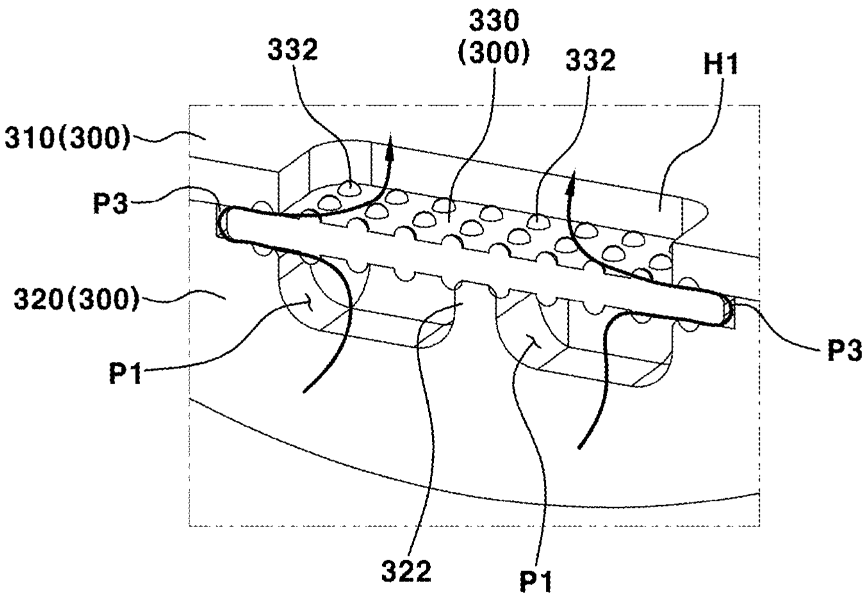
Figure 6:
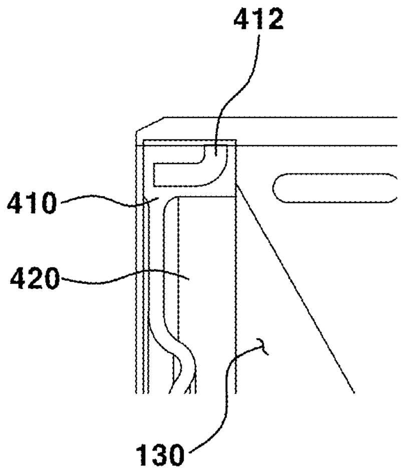
FIG. 6 is a view illustrating a curled portion of a fluid mount device for an electric vehicle according to an embodiment of the present disclosure.

Further, a plurality of protrusion members 332 is provided in the upward/downward direction of the membrane part 330, such that the membrane part 330 may be positioned to be spaced apart from the first nozzle part 310 and the second nozzle part 320 at predetermined distances when the first nozzle part 310 and the second nozzle part 320 are coupled (see FIGS. 3, 4B, and 5B).

More specifically, the protrusion members 332 serve to define a space between the first nozzle part 310 and an upper surface of the membrane part 330 and a space between the second nozzle part 320 and a lower surface of the membrane part 330. The fluid in the lower liquid chamber 120 may selectively flow toward the connection flow path P3 through the spaces, or the fluid in the first damping flow path P1 may selectively flow toward the connection flow path P3.

Particularly, the membrane part 330 including the protrusion members 332 may be made of a material having elasticity. More particularly, the membrane part 330 including the protrusion members 332 may be made of a rubber material. In this regard, when a vibratory force with a fine displacement is applied to the main bushing 100 in an upward or downward direction, the force is not great enough to collapse the protrusion members 332 and the protrusion members 332 maintain a space or distance between the first nozzle part 310 and an upper surface of the membrane part 330 and a space between the second nozzle part 320 and a lower surface of the membrane part 330. However, when a vibratory force with a large displacement is applied to the main bushing 100 in an upward or downward direction, the force is great enough to collapse the protrusion members 332, such that there is no space or distance between the first nozzle part 310 and the upper surface of the membrane part 330 or between the second nozzle part 320 and the lower surface of the membrane part 330. In other words, when the vibratory force with a large displacement is applied, the force is great enough to compress the membrane part 330, including the protrusion members 332, such that the upper and/or lower surfaces of the membrane part 330 are essentially flush with the first and/or second nozzle parts 310, 320. When this happens, the membrane part 330 blocks the first flow hole H1, since fluid is not able to pass around the protrusion members 332, which have been compressed.

The membrane part 330 is seated or disposed on the second nozzle part 320 and defines the connection flow paths P3 without being fixed in position. Because the membrane part 330 is not fixed in position, the membrane part 330 may be dislodged toward the first damping flow path P1 having a predetermined area when the fluid in the lower liquid chamber 120 flows toward the connection flow path P3.

To this end, the first damping flow path P1 may have a support member 322 formed upright to support the membrane part 330 (see FIGS. 4B and 5B).

The support member 322 supports the membrane part 330 when the support member 322 is disposed at a center of the first damping flow path P1 and divides the first damping flow path P1 in a leftward/rightward direction (i.e., into a leftward first damping flow path P1 and a rightward first damping flow path P1, or leftward/rightward portions of the first damping flow path P1). Therefore, the first damping flow path P1 having a predetermined area is divided into two damping flow paths, which may solve the problem arising when the membrane part 330 is structurally dislodged toward the first damping flow path P1.

The first nozzle part 310 may have a second flow hole H2 spaced apart from the first flow hole H1 and formed and configured to allow the fluid to flow therethrough. The second damping flow path P2 communicates with the second flow hole H2, defines a predetermined route, extends toward rear sides of the connection flow paths P3 along a front rim of the connection flow paths P3 (i.e., extends toward a rear side of the second nozzle part 320 and along a front rim of the second nozzle part 320), and communicates with the rear liquid chamber 130.

For example, the second damping flow path P2 is formed and configured so that the fluid selectively flows through the second flow hole H2 as the first damping flow path P1 is blocked by the membrane part 330.

For example, when a vibratory force with a fine displacement is applied to the main bushing 100 in a downward direction, the fluid flows through the connection flow paths P3 along the rim of the membrane part 330 by a change in volume of the lower liquid chamber 120. If a vibratory force with a large displacement is applied in the downward direction, the first nozzle part 310 is pressed by a change in volume of the lower liquid chamber 120, and the first flow hole H1 is blocked by the membrane part 330.

For example, the fluid accommodated in the lower liquid chamber 120 flows to the rear liquid chamber 130 along the second damping flow path P2 through the second flow hole H2. Therefore, the fluid flows through the second damping flow path P2 having a relatively larger area than the connection flow path P3. As a result, low dynamic characteristics may be effectively maintained even though not only a vibratory force with a fine displacement but also a vibratory force with a large displacement is applied.

For example, as described above, the coupling plate 400 may expand when the fluid accommodated in the lower liquid chamber 120 flows to the rear liquid chamber 130 by a change in volume of the lower liquid chamber 120 through the first damping flow path P1 or the second damping flow path P2.

In other words, the coupling plate 400 is mounted at the rear side of the main bushing 100 as the coupling plate 400 is forcibly press-fitted into or onto the inner pipe 10. The coupling plate 400 is formed to seal the rear liquid chamber 130 that communicates with the lower liquid chamber 120 through the first damping flow path P1 and the second damping flow path P2. For example, the coupling plate 400 is configured to be expandable or contractible by the flowing fluid, which may solve a problem where dynamic characteristics are increased by volume expansion resistance.

To this end, the coupling plate 400 includes a ring plate 410 and a diaphragm 420.

The ring plate 410 is formed to have the same outer diameter as the main bushing 100 and mounted to adjoin the rear side of the main bushing 100 (see FIGS. 2 and 3).

As illustrated in FIG. 6, which is a blown up view of section A in FIG. 3, the ring plate 410 may have a curled portion 412 bent so that the ring plate 410 is seated or positioned at the rear side of the main bushing 100. The curled portion 412 may be matched with a mid-pipe 20 at the rear side of the main bushing 100 and seal the rear liquid chamber 130 when the coupling plate 400 including the ring plate 410 is coupled to the inner pipe 10.

The diaphragm 420 is coupled to and surrounds the ring plate 410 and blocks an opened rear region of the main bushing 100 to define the rear liquid chamber 130.

For example, the diaphragm 420 may be made of a material such as rubber having elasticity. Therefore, when the fluid flows to the rear liquid chamber 130 through the first damping flow path P1 or the second damping flow path P2, the diaphragm 420 is deformed by elasticity, such that the rear liquid chamber 130 may be contracted or expanded.

As illustrated in FIGS. 4A-4D, a flow path of the fluid, which is made by a vibratory force applied in the downward direction based on the central portion of the inner pipe 10, is described below.

As illustrated in FIG. 4A, when a vibratory force with a fine displacement is applied in the downward direction based on the central portion of the inner pipe 10, the fluid in the lower liquid chamber 120 is discharged toward the membrane part 330 while passing through the first flow hole H1 by a change in volume of the lower liquid chamber 120. As illustrated in FIG. 4B, the fluid flows to the connection flow paths P3, i.e., the space formed between the first nozzle part 310 and the upper surface of the membrane part 330 by the protrusion members 332 and the space formed between the second nozzle part 320 and the lower surface of the membrane part 330 by the protrusion members 332.

Figure 4C:
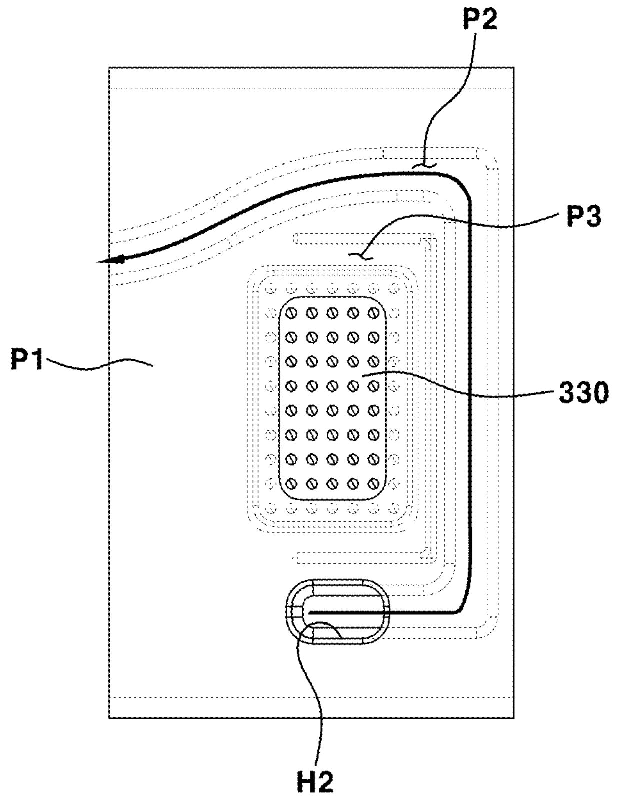
Figure 4D:
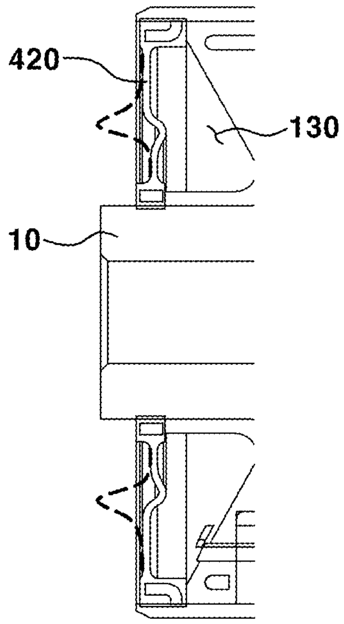

The fluid, which has flowed as described above, flows toward the first damping flow path P1 while flowing through the connection flow paths P3 formed along the rim of the membrane part 330. As illustrated in FIG. 4D, the fluid flowing along the first damping flow path P1 flows to the rear liquid chamber 130, such that the diaphragm 420 is expanded. Therefore, low dynamic characteristics may be maintained against the fluid mount device 1 even though a vibratory force with a fine displacement is applied.

For example, if a vibratory force with a large displacement is applied in the downward direction based on the central portion of the inner pipe 10, the first nozzle part 310 presses the membrane part 330 in accordance with a change in volume of the lower liquid chamber 120, and the first flow hole H1 is blocked. Therefore, as illustrated in FIG. 4C, the fluid flows toward the rear liquid chamber 130 while flowing along the second damping flow path P2 through the second flow hole H2.

As illustrated in FIG. 4D, the fluid flowing along the second damping flow path P2 flows to the rear liquid chamber 130, such that the diaphragm 420 is expanded. Therefore, low dynamic characteristics may be maintained against the fluid mount device 1 even though a vibratory force with a large displacement is applied.

As illustrated in FIGS. 5A-5D, a flow path of the fluid, which is made by a vibratory force applied in the upward direction based on the central portion of the inner pipe 10, is described below.

Figure 5C:
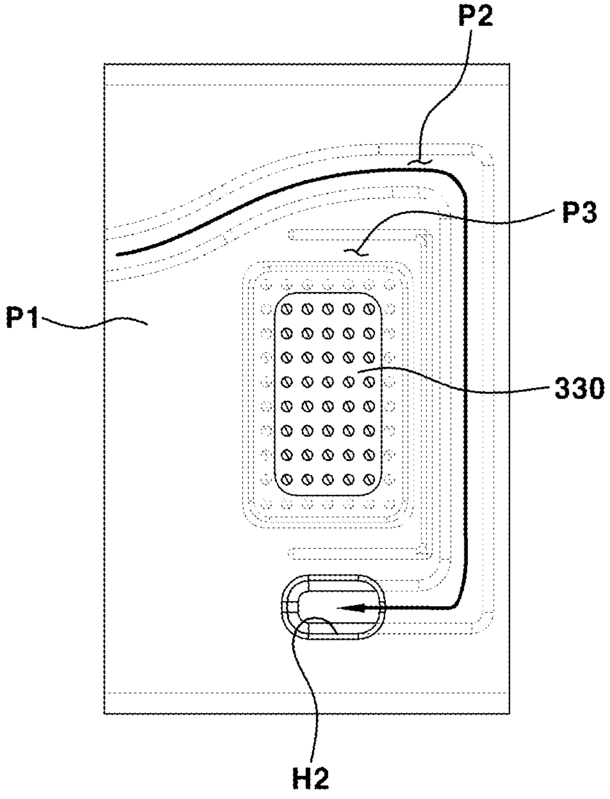
Figure 5D:
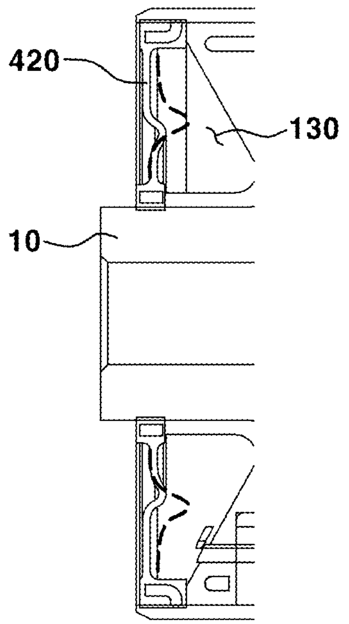

As illustrated in FIG. 5A, when a vibratory force with a fine displacement is applied in the upward direction based on the central portion of the inner pipe 10, the fluid at the rear side flows in accordance with a change in volume of the lower liquid chamber 120, such that the diaphragm 420 is contracted, as illustrated in FIG. 5D.

For example, as the diaphragm 420 is contracted, the fluid accommodated in the rear liquid chamber 130 flows to the first damping flow path P1. As illustrated in FIG. 5B, the fluid flowing from the first damping flow path P1 flows through the connection flow paths P3 formed along the rim of the membrane part 330. In other words, the fluid flows to the space formed between the first nozzle part 310 and the upper surface of the membrane part 330 by the protrusion member 332 and the space formed between the second nozzle part 320 and the lower surface of the membrane part 330 by the protrusion member 332.

The fluid, which has flowed as described above, flows to the lower liquid chamber 120 while passing through the first flow hole H1. As a result, the fluid in the rear liquid chamber 130 flows to the lower liquid chamber 120, such that low dynamic characteristics may be maintained against the fluid mount device 1 even though a vibratory force with a fine displacement is applied.

For example, if a vibratory force with a large displacement is applied in the upward direction based on the central portion of the inner pipe 10, the second nozzle part 320 presses the first nozzle part 310, which includes the membrane part 330, in accordance with a change in volume of the lower liquid chamber 120, such that the first flow hole H1 is blocked (i.e., the protrusion members 332 are compressed such that there is no space or distance between the first and second nozzle parts 310, 320 and the membrane part 330). Therefore, as illustrated in FIG. 5C, the fluid is discharged through the second flow hole H2 while flowing along the second damping flow path P2.

Particularly, the fluid discharged through the second flow hole H2 may cope with a change in volume of the lower liquid chamber 120 while flowing to the lower liquid chamber 120, such that low dynamic characteristics may be maintained against the fluid mount device 1 even though a vibratory force with a large displacement is applied.

According to the present disclosure, the lower liquid chamber 120 and the rear liquid chamber 130, which is connected to the lower liquid chamber 120, are separated, and the membrane part 330 is added to the lower liquid chamber 120, such that the fluid flows along the damping flow paths P1, P2 from the lower liquid chamber 120 to the rear liquid chamber 130 or from the rear liquid chamber 130 to the lower liquid chamber 120 when a volume is changed by a load, thereby maintaining low dynamic characteristics.

In addition, according to the present disclosure, the structure of the diaphragm 420 is applied to the rear liquid chamber 130 to absorb resistance made by the expansion of the volume of the rear liquid chamber 130 when the fluid flows from the lower liquid chamber 120 to the rear liquid chamber 130, which may solve the problem where dynamic characteristics are increased by volume expansion resistance.

While the present disclosure has been described above with reference to the embodiment(s) illustrated in the drawings, the embodiments are described just for illustration, and those having ordinary skill in the art will understand that various modifications of the embodiments may be made, and all or some of the described embodiment(s) may be selectively combined. Accordingly, the true technical protection scope of the present disclosure should be determined by the technical spirit of the appended claims.

The technical concepts of the present disclosure have been described in detail with reference to embodiments thereof. However, it should be appreciated by those having ordinary skill in the art that various modifications and improvements may be made in these embodiments without departing from the principles and spirit of the present disclosure, the scope of which is defined in the appended claims and their equivalents.

What is claimed is:

1. A fluid mount device comprising:

a main bushing mounted on an outer peripheral surface of an inner pipe and having a plurality of liquid chambers separated from each other;

an outer pipe mounted on an outer peripheral surface of the main bushing and configured to seal the plurality of liquid chambers;

a nozzle unit having a damping flow path configured to allow a fluid accommodated in a liquid chamber of the plurality of liquid chambers to flow in accordance with a change in volume of the liquid chamber; and a coupling plate mounted at a rear side of the main bushing and configured to seal a rear liquid chamber that communicates with the liquid chamber through the damping flow path.

2. The fluid mount device of claim 1, wherein, in the main bushing, the plurality of liquid chambers includes an upper liquid chamber and a lower liquid chamber separated from each other in an upward/downward direction based on the inner pipe.

3. The fluid mount device of claim 2, wherein the nozzle unit is positioned within the lower liquid chamber and configured to allow the lower liquid chamber and the rear liquid chamber to communicate with each other.

4. The fluid mount device of claim 2, wherein the nozzle unit comprises:

a first nozzle part having a first flow hole, the first flow hole being configured to allow the fluid to be discharged from the lower liquid chamber, or to be introduced into the lower liquid chamber;

a second nozzle part disposed to face the first nozzle part, the second nozzle part having the damping flow path, wherein the damping flow path includes a first damping flow path and a second damping flow path that both communicate with the rear liquid chamber; and a membrane part disposed on the second nozzle part and configured to selectively block the first flow hole while defining a connection flow path that communicates with the first damping flow path.

5. The fluid mount device of claim 4, wherein the connection flow path is formed along a rim of the membrane part positioned between the first nozzle part and the second nozzle part.

6. The fluid mount device of claim 4, wherein the membrane part has a plurality of protrusion members provided in the upward/downward direction so that the membrane part is spaced apart from the first nozzle part and the second nozzle part.

7. The fluid mount device of claim 4, wherein the membrane part is made of a material having elasticity.

8. The fluid mount device of claim 4, wherein the first damping flow path has a support member disposed upright therein to support the membrane part.

9. The fluid mount device of claim 4, wherein the first nozzle part has a second flow hole spaced apart from the first flow hole.

10. The fluid mount device of claim 9, wherein the second damping flow path communicates with the second flow hole and extends toward a rear side of the second nozzle part along a front rim of the second nozzle part.

11. The fluid mount device of claim 10, wherein the second damping flow path is configured to allow the fluid to flow through the second flow hole based on the first damping flow path being blocked by the membrane part.

12. The fluid mount device of claim 4, wherein the second nozzle part comprises an outer peripheral surface having a curvature, such that the outer peripheral surface of the second nozzle part corresponds to an inner peripheral surface of the outer pipe.

13. The fluid mount device of claim 1, wherein the coupling plate comprises:

a ring plate having a same size as the main bushing and mounted to the main bushing; and a diaphragm coupled to and surrounding the ring plate and configured to block an open rear region of the main bushing to define the rear liquid chamber.

14. The fluid mount device of claim 13, wherein the ring plate includes a curled portion bent so that the ring plate is disposed on the main bushing.

15. The fluid mount device of claim 13, wherein the diaphragm is made of a material having elasticity, such that the diaphragm is expandable as the fluid flows to the rear liquid chamber through the damping flow path.

* * * * *